Figure 1:
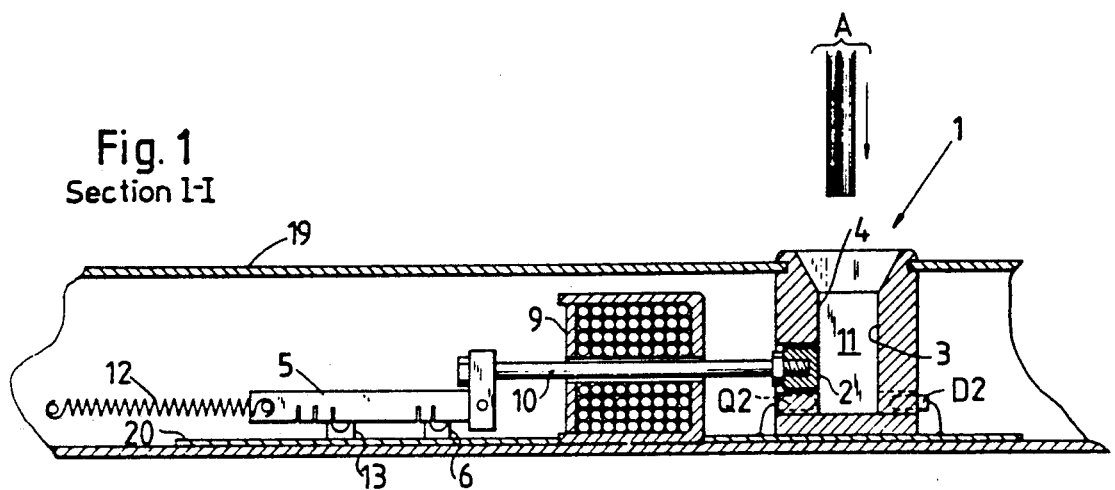

United States Patent [19]

Tholérus

[11] Patent Number: 5,031,464
[45] Date of Patent: Jul. 16, 1991

[54] APPARATUS FOR THICKNESS DETERMINATION

[76] Inventor: Jan Tholérus, Stormyrsvägen 13A, S-183 41 Täby, Sweden

[21] Appl. No.: 472,761

[22] Filed: Jan. 31, 1990

[30] Foreign Application Priority Data

Sep. 15, 1989 [SE] Sweden ............................ 8903048

[51] Int. Cl.⁵ .......................................... G01N 3/08
[52] U.S. Cl. ........................................ 73/818; 33/784
[58] Field of Search ................... 235/98 R; 73/818; 33/1 B, 784, 790, 831, 832, 833, 712

[56] References Cited

U.S. PATENT DOCUMENTS 4,419,824 12/1983 Oberhans ............................ 33/784
4,767,250 8/1988 Garlichs ............................... 412/11

FOREIGN PATENT DOCUMENTS 101001 8/1980 Japan ................................... 33/784

Primary Examiner—Jerry W. Myracle
Attorney, Agent, or Firm—Cooper & Dunham

[57] ABSTRACT

An apparatus for determining the thickness of wads of papers (A) in connection with their binding within a cover, comprises an automatically released compressing device (2), which indicates, on a display, a required thickness value. The apparatus can be entirely mechanical, but is preferably provided with an electronic control circuit and an electric solenoid drive circuit. On insertion in a receiver (1), the wad of papers (A) actuates an electro-optical switch (D2, Q2) which energizes the solenoid (9), the armature (10) of which compresses the wad of papers (A). During the compressing movement, pulses received from two reading device (6, 13) are counted, the total number of pulses representing a measure of the required thickness value.

15 Claims, 2 Drawing Sheets

Section I-I

APPARATUS FOR THICKNESS DETERMINATION

TECHNICAL FIELD

The present invention relates to an apparatus for determining the thickness of an object, preferably in connection with binding together a number of loose sheets of paper, for example, within a cover. The apparatus comprises a receiver means for receiving the object and is provided with a movable compressing means which in cooperation with a counterstay is adapted to determine the thickness of the object. The movable compressing means is connected to position detecting means adapted to indicate, on a display means, the thickness value determined therethrough.

BACKGROUND ART

From the Australian patent specification No. 567 839 it is known to use, in a thermal binding machine, a manual device for determining which cover dimension to be used for the the wad of papers to bound. The wad-receiving means of the known apparatus is formed as a plate mounted at the front edge of the binding machine and provided with a handle, the plate being displaceable towards the front edge. For determining the thickness of a wad of papers, said wad of papers is inserted between the handle and the front edge of the machine, then the plate will be manually displaced such that the wad of papers is pressed by the handle towards said front edge. The plast is mechanically connected to a potentiometer such as to provide position detection. The position-indicating voltage value given by the potentiometer is used to light, accordingly, a series of light emitting diodes, LEDs, or liquid crystal diodes, LCDs, forming a display. Thereby, the display can indicate the thickness either in mm or in inches, and is said to indicate, to advantage, the directly required cover dimension.

The known manual device presents a number of disadvantages. Firstly, it should be pointed out that said device is unreliable, as manual displacement of the plate implies that the wad of papers can be compressed unequally hard, meaning that you may receive different answers as to what cover dimension is required. The operator having to use both hands to handle the manual device is another troublesome disadvantage. Further, manual handling is relatively time-consuming and implies exterior movable parts which are easily damaged and, not least, require more space for the machine.

DESCRIPTION OF INVENTION

The disadvantages mentioned above are eliminated entirely by the apparatus according to the present invention, which is characterized by its function being automatic and by the press power applied being substantially constant. This is achieved in that insertion of the object to be thickness-determined into the receiver means actuates a release means connected to the compressing means which in itself performs the actual thickness determination.

Such an automatic thickness determination according to the present invention can be achieved by a fully mechanical device in which the release means comprises a locking means, for example a latch releasing the compressing means spring-loaded against the counterstay. The compressing means is directly or indirectly, for instance via a gear mechanism, connected to an indicator which indicates, on a suitably graded scale, the thickness value obtained or directly the required cover dimension.

A more sophisticated solution is achieved according to the present invention by the apparatus having a compressing means formed at one end of an armature linearly displaceable in a solenoid. The other end of the armaturee is connected to the position detecting means. The solenoid is energized when the release means is actuated by the object inserted in the receiver means, the release means being an electric switch means for the solenoid drive circuit.

A suitable embodiment of the position detecting means comprises a code disc, the travel length of which is read by at least one reading means. Thereby the code disc is provided with an information code being read by the reading means during the relative movement of the code disc and the reading means taking place when the solenoid is energized.

Preferably there are supplied two reading means adapted to read the information code of the code disc and to give pulse shaped output signals to a microcomputer for signal processing and for controlling a display and the drive circuit of the solenoid. In order to avoid incorrect signal processing the microcomputer is adapted to count up one step for alternatingly incoming pulses from the two reading means. Should the microcomputer receive two pulses from one reading means without having received an intermediate pulse from the other reading means, the microcomputer will count up only one step.

A further development of the apparatus comprises a timer which after a predetermined amount of time will activate the solenoid drive circuit to working at a reduced effect. In this way, the advantage is achieved that the armature, and therefore the compressing means, is given a softly rounded off linear pressing movement towards the object inserted in the receiver means.

A PREFERRED EMBODIMENT

Figure 2:
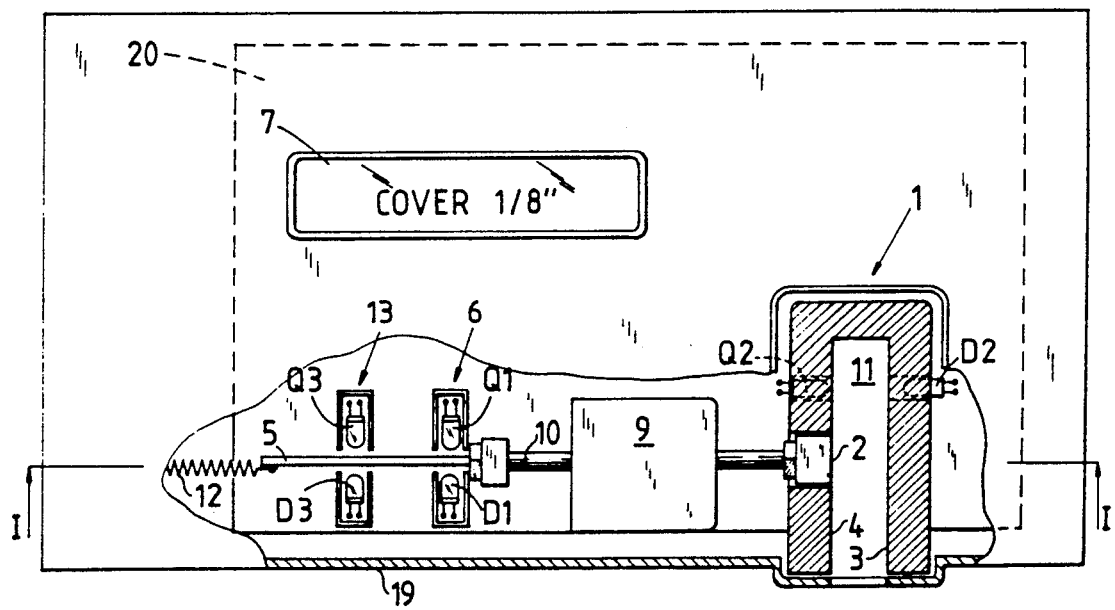
Figure 3:
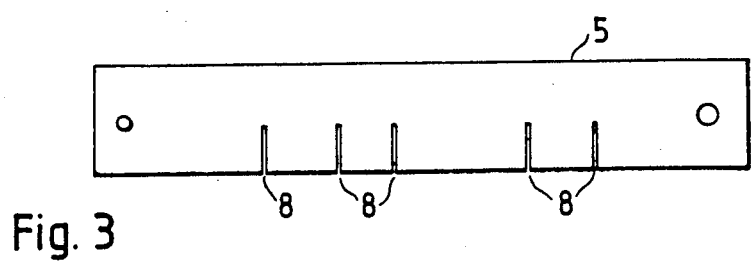
Figure 4:
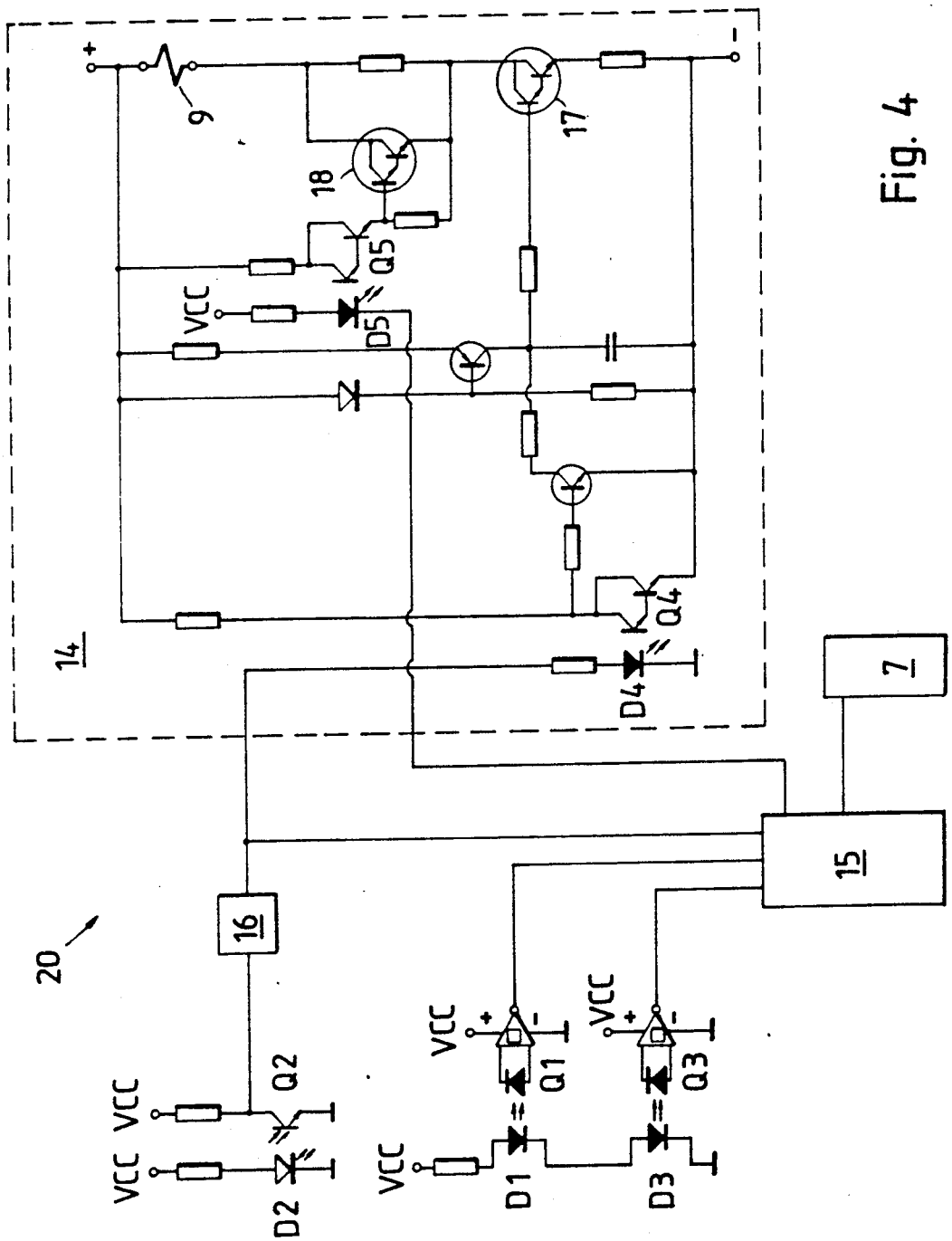

The apparatus according to the invention will be described below in more detail with reference to the accompanying drawings which illustrate a preferred embodiment of the invention and in which FIG. 1 is a sectional view of the apparatus according to the invention along the line I—I in FIG. 2, FIG. 2 is a plan view, partly in section, of the gauging device according to the invention, FIG. 3 is a side view of a code disc included in the apparatus according to the invention, and FIG. 4 is a wiring diagram, partly in block form, for a drive circuit and its control circuit for the gauging device according to the invention.

In FIGS. 1 and 2 there is illustrated a preferred embodiment of a gauging device for establishing the thickness of an object according to the invention. The device is accommodated in a cover 19 and can be a separate unit on its own or, for example, can be part of a binding machine (not shown) in which there is a common cover 19. In FIG. 2, part of the cover 19 has been cut away in order to illustrate the components of the gauging device. FIG. 1 is a longitudinal sectional view of the gauging device along the line I—I in FIG. 2.

The preferred embodiment of the gauging device is based on a printed circuit card 20, the electronic components of which will be described in connection with FIG. 4.

The gauging device comprises a receiver means 1 projecting from the cover 19, the receiver means preferably being made of plastic and in section forming a U-shaped chamber 11 for receiving the object A the thickness of which is to be established. The receiver means 1 and its chamber 11 need only be of limited length and be open upwards as well as in one lateral direction, the receiver means 1 being situated at one short or long side of the cover 19. Considering the limited length, only a corner of the object A to be thickness-determined will be inserted in the chamber 11.

The chamber 11 of the receiver means 1 is defined by two substantially plane-parallel walls 3, 4, at least one of which (in this case wall 4) is entirely or partly constituted by a compressing means 2 displaceable transversely to the plane of the walls 3, 4. In the embodiment shown, the wall 3 forms a fixed counterstay. In an alternative embodiment, both walls 3, 4 can be reciprocally displaceable such that both the comressing means 2 and its counterstay 3 will be moved during determination of the thickness of the object A inserted in the chamber 11.

The compressing means 2 is supported at one end by an armature 10 which is linearly displaceable and is activated by a solenoid 9. The other end of the armature 10 is connected to a position detecting means comprising a code disc 5 running between two reading means 6 and 13. The compressing means 2 is held in its rest position, i.e. withdrawn into the wall 4, by means of a spring 12 connected to the open end of the code disc 5.

On insertion of the object A in the chamber 11, the solenoid 9 is automatically energized in that a light beam from a light emitting diode D2 to a photo-transistor Q2 is broken by the object A. The armature 10, and therefore the compressing means 2, will then be displaced towards the object A, pressing it towards the counterstay, i.e. the wall 3. Also the code disc 5 will participate in the displacing movement, thus being moved past the reading means 6 and 13.

In FIG. 3 there is depicted the code disc 5 which comprises a rectangular rod-shaped rail at whose lower edge a number of narrow channels or slots 8 are cut into the rail towards the centre of the same transversely to its longitudinal axis. The slots 8, being through slots, let through light from light emitting diodes D1, D3 to photo-transistors Q1, Q3 included in the reading means 6 and 13, respectively, when being passed thereby. The photo-transistors Q1, Q3 then generate electric pulse signals. The number of slots 8 and their relative positions are dependent on the measurement units to be displayed by the display means 7 (FIGS. 2 and 4) included in the gauging device. The position of the slots 8 on the rail 5 shown in FIG. 3 is set such that the display means 7 will indicate a cover dimension (COVER ⅛" in FIG. 2) suitable for the actual wad of papers inserted in the chamber 11, which wad of papers constitutes the object A, the thickness of which is to be determined and which is to be bound into a cover.

An electronic control circuit for the drive circuit 14 of the solenoid 9 and for operating the display means 7 is shown in FIG. 4 as a combined block and wiring diagram. The electronic components included are mounted on the printed circuit card 20. The photo-transistor Q2 of the receiver means 1 (FIGS. 1 and 2) is electrically connected to a timer 16, the output of which is connected to a microprocessor 15 as well as to the drive circuit 14 of the solenoid 9. The transmission to the drive circuit 14 is performed via a light emitting diode D4 and a photo-transistor Q4, such that the drive circuit 14 is kept electrically insulated from the control circuit. The signal from the photo-transistor Q4 causes a transistor circuit 17 to energize the solenoid 9, which will then be driven at full effect.

Further, the signal from the timer 16 will start the microprocessor 15 which also receives electric pulse signals from the photo-transistors Q1 and Q3 of the reading means 6 and 13. As described in connection with FIG. 3, the pulses received from the photo-transistors Q1 and Q3 are due to the code disc 5 being now displaced by the activated solenoid 9 and are counted alternately by the microprocessor 15. Thus, even if one of the photo-transistors, for example Q1, should generate two pulses before the other photo-transistor (in this case Q3) generates a pulse, the microprocessor 15 will count only one pulse and a pulse must then be generated by the other photo-transistor (Q3), which pulse will be counted by the microprocessor 15, before a pulse from the first photo-transistor (Q1) can be counted. Such an alternate counting ensures that incorrect indication will not occur even if, for example, the compressing means 2 (FIGS. 1 and 2) should bounce against the object A inserted in the chamber 11.

In order to achieve a softly rounded off displacing movement for the compressing means 2, the microprocessor 15 is adapted to supply, after a fixed amount of the time as from the moment a starting pulse is received from the timer 16, a control signal to the drive circuit 14. Said control signal is transmitted, for reasons of insulation, via a light emitting diode D5 and a photo-transistor Q5, and the signal received from the photo-transistor Q5 will actuate the supply circuit of the solenoid 9 through a transistor circuit 18, such that energizing of the solenoid 9 is reduced to half the original effect. The rate of movement of the compressing means 2 is then reduced.

When, at half the energizing effect of the solenoid 9, the compressing means 2 has pressed the object A towards the counterstay 3, the compressing means will remain in this position. No further pulses are transmitted to the microporcessor 15 from the photo-transistors Q1, Q3 of the reading means 6, 13, as displacement of the code disc 5 is stopped. The pulses counted in the microprocessor 15 cause the microprocessor 15 to supply an output signal that will activate the display means 7, which in the embodiment illustrated is an aplhanumeric display.

After an amount of time predetermined by the timer 16, the feeding of an output signal to the microprocessor 15 and to the drive circuit 14 ceases. The microprocessor 15 returns to its initial position, but the alphanumeric indication of the display 7 is preferably maintained. The transistor circuit 17 of the drive circuit 14 interrupts the energizing of the solenoid 9, and the armature 10 with the compressing means 2 connected thereto and the code disc 5 will return to the rest position by means of the force of the spring 12. The object A can then be removed from the chamber 11, the thickness measurement result required still being indicated on the display 7.

Although the apparatus according to the invention has been described above by way of examples in connection with binding sheets of paper within covers, there may be several other applications, where thickness determination or the equivalent is required. The described, preferred embodiment of the apparatus according to the invention is based on an electronically controlled electric supply circuit. As will be obvioux to the expert, individual components may be replaced by other components without the inventive idea being left. For example, it is possible to use linear drive means other than the solenoid depicted. It is possible to use toggle switches replacing the light switching means in the chamber of the receiver means. Further, it is possible to replace the slotted rod-shaped rail by other information coded means such as e.g. a bar code means or fully mechanical code transmitters and code readers. As stated in the introductory description of the invention, the apparatus can be provided entirely with mechanical means, although at present this is not a preferred embodiment.

It should be understood that the present invention is not limited to the embodiment described above with reference to the drawings but can be modified in various ways within the limits of the claims stated below.

I claim:

1. An apparatus for determining the thickness of an object, such as a number of loose sheets of paper, comprising a receiver means, displaceable compressing means adapted to cooperate with an oppositely located support means, a position detecting means operatively connected to said compressing means, display means connected to said position detecting means for displaying the object thickness, release means connected to said compressing means and activated by the object whose thickness is to be determined, said position detecting means including a code assembly that generates a code signal to said display means in response to the travel of said compressing means.

2. An apparatus according to claim 1, characterized in that said code assembly comprises an information code readable by a first reading means forming part of said position detecting means.

3. An apparatus according to claim 2, characterized in that the code assembly comprises a rectangular rod-shaped rail defining, as the information code, narrow channels or slots adapted to be read by the first reading means consisting of a light-emitting diode and photo-transistor mounted on either side of the rail.

4. An apparatus according to claim 2, characterized in that the compressing means is formed at one end of an armature which is linearly displaceable in a solenoid operated by a solenoid drive circuit, the other end of the armature is connected to the code assembly, the solenoid being adapted to be energizsed on insertion of the object, such as a wad of papers, whose thickness is to be determined, into the receiver means to activate said release means, which release means includes electric switch means for the solenoid drive circuit.

5. An apparatus according to claim 4, characterized in that the switch means comprises a photo-transistor and a light-emitting diode mounted on opposing walls of the receiver means, which walls define a chamber in which the object whose thickness is to be determined is insertable.

6. An apparatus according to claim 4 or 5, characterized in that the compressing means comprises at least part of one wall of the receiver means, the other wall being fixed.

7. An apparatus according to claim 4 or 5 characterized in that the compressing means comprises at least part of the walls of the receiver means, said walls being movable towards each other.

8. An apparatus according to claims 4 or 5, characterized in that the compressing means is spring-loaded against its rest position when the solenoid is inactive.

9. An apparatus according to claim 5 comprising a second reading means mounted in the area of the code assembly and including a light-emitting diode and a photo-transistor mounted in a corresponding way with respect to the code assembly as the first-mentioned reading means, such as to counteract, by means of code information read, the continued reading of the first-mentioned reading means in the case of a bouncing movement of the armature.

10. An apparatus according to claim 9, characterized in that the first and second reading means are electrically connected to a microcomputer for processing code information read by the reading means, such that the resulting thickness value will be indicated on the display means.

11. An apparatus according to claim 9 or 10, characterized in that the code information read by the first and second reading means are used alternately, such that only one pulse from the first-mentioned reading means can be counted before a pulse from the second reading means is counted, the total number of counted pulses representing a measurement of the thickness value.

12. An apparatus according to claim 10, characterized in that the microcomputer is adapted to be started by a starting pulse received from the switch means on insertion in the chamber of the object whose thickness is to be determined and to count, thereafter, the pulses received from the first and second reading means.

13. An apparatus according to claim 12, characterized in that a timer is adapted to be activated by the photo-transistor of the switch means, the timer being adapted to control the microcomputer such that after a predetermined amount of time the energizing effect for the drive circuit of the solenoid will be reduced so that the finishing movement of the armature will be moderated.

14. An apparatus according to any one of claims 10, 12, or 13, characterized in that the drive circuit of the solenoid is electrically separated from the control circuit in that the communications with the switch means and with the microcomputer comprise additional light-emitting diodes and photo-transistors.

15. An apparatus according to claim 13, characterized in that the drive circuit of the solenoid comprises an amplification stage for energizing the solenoid at full effect and a separate amplification stage controlled by the microcomputer for reducing the energizing effect in order to achieve the moderated finishing movement of the armature.

* * * * *